(12) United States Patent
Yi

(10) Patent No.: US 9,158,676 B2
(45) Date of Patent: Oct. 13, 2015

(54) NONVOLATILE MEMORY CONTROLLER AND A NONVOLATILE MEMORY SYSTEM

(71) Applicant: SAMSUNG ELECTRONICS CO., LTD., Gyeonggi-do (KR)

(72) Inventor: Jong-wan Yi, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 289 days.

(21) Appl. No.: 13/829,767

(22) Filed: Mar. 14, 2013

(65) Prior Publication Data
US 2013/0297968 A1  Nov. 7, 2013

(30) Foreign Application Priority Data

May 4, 2012  (KR) .................. 10-2012-0047591

(51) Int. Cl.
*G06F 11/00* (2006.01)
*G06F 12/02* (2006.01)
*G06F 11/07* (2006.01)

(52) U.S. Cl.
CPC .......... *G06F 12/0246* (2013.01); *G06F 11/073* (2013.01); *G06F 11/0793* (2013.01)

(58) Field of Classification Search
CPC .......................... G06F 11/1008; G06F 11/1016
See application file for complete search history.

(56) References Cited

U.S. PATENT DOCUMENTS

| | | | |
|---|---|---|---|
| 6,031,780 A | 2/2000 | Abe | |
| 6,577,553 B2 | 6/2003 | Makabe et al. | |
| 6,832,276 B2 | 12/2004 | Shigenobu | |
| 7,266,637 B1 | 9/2007 | van Rietschote | |
| 7,574,611 B2 * | 8/2009 | Cohen ......................... | 713/300 |
| 7,631,245 B2 * | 12/2009 | Lasser ......................... | 714/768 |
| 7,802,061 B2 * | 9/2010 | Qawami et al. ............. | 711/154 |
| 8,595,411 B2 * | 11/2013 | Selinger et al. ............. | 711/103 |
| 2004/0236909 A1 * | 11/2004 | Shikata et al. .............. | 711/115 |
| 2007/0226476 A1 * | 9/2007 | Cohen ......................... | 712/245 |
| 2008/0155309 A1 * | 6/2008 | Cheong et al. .............. | 714/5 |
| 2009/0089488 A1 | 4/2009 | Yasui | |
| 2010/0306423 A1 | 12/2010 | Hashimoto | |

FOREIGN PATENT DOCUMENTS

| | | |
|---|---|---|
| JP | 2002-358231 | 12/2002 |
| JP | 2003-162515 | 6/2003 |
| JP | 2008-090435 | 4/2008 |
| JP | 2010-219630 | 9/2010 |
| JP | 2011-191875 | 9/2011 |
| KR | 1020010058548 | 7/2001 |
| KR | 1020080083878 | 9/2008 |

* cited by examiner

*Primary Examiner* — Philip Guyton
(74) *Attorney, Agent, or Firm* — F. Chau & Associates, LLC

(57) ABSTRACT

A nonvolatile memory (NVM) controller that includes a command decoder that receives a command from a host and outputs an index in response to the command, a program memory that stores a command mapping table including address information for accessing a program corresponding to the command and a processor that receives an index from the command decoder and controls the address information to be output in response to the index.

13 Claims, 11 Drawing Sheets

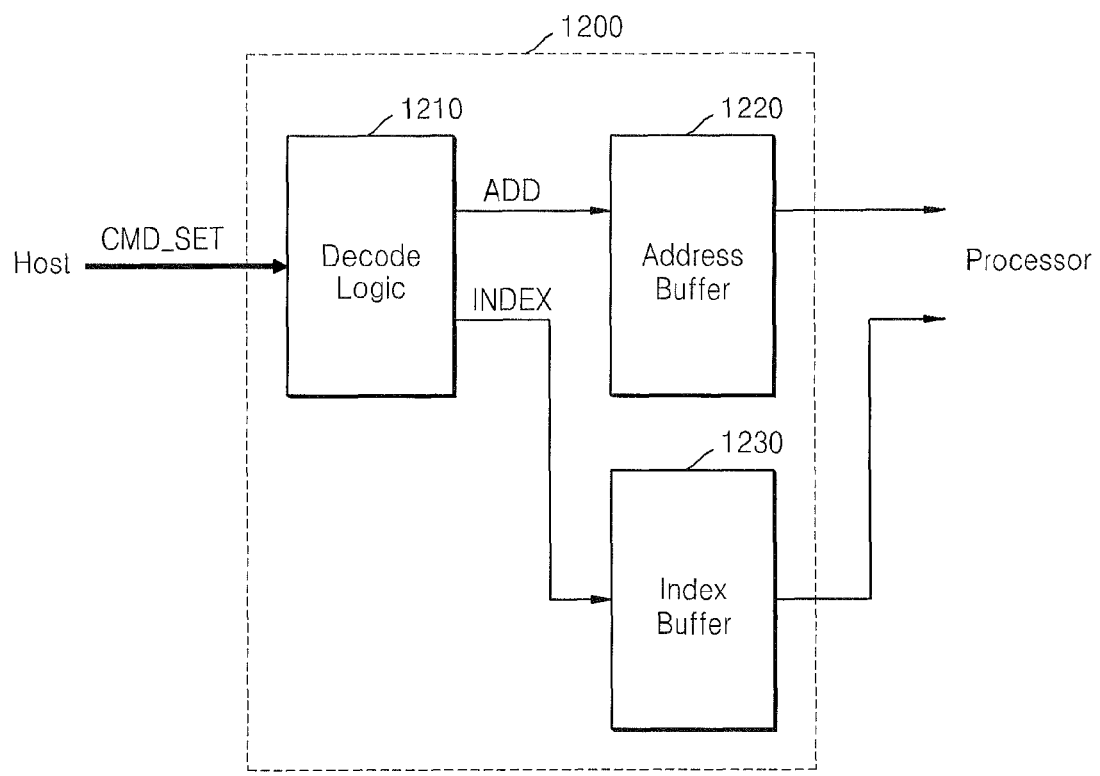

NONVOLATILE MEMORY CONTROLLER AND A NONVOLATILE MEMORY SYSTEM

CROSS-REFERENCE TO RELATED APPLICATION

This application claims priority under 35 U.S.C. §119 to Korean Patent Application No. 10-2012-0047591, filed on May 4, 2012, in the Korean Intellectual Property Office, the disclosure of which is incorporated by reference herein in its entirety.

BACKGROUND

1. Technical Field

The inventive concept relates to a nonvolatile memory (NVM) controller, and more particularly, to an NVM controller and system which receive a command from a host and perform an operation on an NVM device.

2. Discussion of the Related Art

NVM devices can retain stored data even when not powered. Flash memories are NVM devices which may be electrically programmed or erased. NAND flash memories are a type of flash memories. NAND flash memories are accessible in units of blocks, and each of the blocks includes a plurality of pages. Data is read and written in units of pages whereas data is erased in units of blocks.

An error correction code (ECC) may be used to compensate for bits which may fail during an operation of a NAND flash memory. When doing erase or program operations, blocks that fail to program or erase data may be detected and marked as bad. The data may then be written to a different, good block.

Managed NAND flash memories may combine an NVM controller with raw NAND to perform error correction and detection as well as memory management functions. Managed NAND memories may be embodied as single semiconductor packages or packages that support standardized host interfaces such as multimedia memory cards (MMCs) and secure digital (SD) cards.

SUMMARY

An exemplary embodiment of the inventive concept provides a nonvolatile memory (NVM) controller and an NVM system which may rapidly recognize a command received from a host and perform an operation corresponding to the command.

According to an exemplary embodiment of the inventive concept, there is provided an NVM controller including: a command decoder that receives a command from a host and outputs an index in response to the command; a program memory that stores a command mapping table including address information for accessing a program corresponding to the command; and a processor that receives the index from the command decoder and controls the address information to be output in response to the index. The program memory stores at least one program performed by the processor, and the processor performs a program corresponding to the address information output from the program memory.

The program memory stores an error handling program that handles an error in the command, and when the command has the error, the index output from the command decoder is an index of the command mapping table enabling access to the error handling program.

The command is a command set that includes a first command and a second command which are sequentially received at the command decoder, and the command decoder outputs an index in response to the command set.

The command set includes an address of an NVM device, and the command decoder extracts the address of the NVM device from the command set.

The command decoder includes a first memory that stores addresses of a plurality of NVM devices, and the processor receives the addresses of the plurality of NVM devices from the first memory.

The first memory operates as a queue.

The command decoder includes a second memory that stores a plurality of indexes, and the processor receives the plurality of indexes from the second memory.

The second memory operates as a queue.

The processor includes a cell array that stores data, receives the command mapping table from the program memory, stores the command mapping table in the cell array, and controls the address information stored in the cell array to be output.

According to an exemplary embodiment of the inventive concept, there is provided an NVM system including: an NVM controller; and at least one NVM device that is controlled by the NVM controller, wherein the NVM controller includes: a command decoder that receives a command from a host and outputs an index in response to the command; a program memory that stores a command mapping table including address information for accessing a program corresponding to the command; and a processor that receives the index from the command decoder and controls the address information to be output in response to the index.

The program memory stores at least one program performed by the processor, and the processor performs a program corresponding to the address information output from the program memory.

The command is a command set that includes a first command a second command which are sequentially received at the command decoder, and the command decoder outputs an index in response to the command set.

The command set includes an address of the NVM device, and the command decoder extracts the address of the NVM device from the command set, and comprises a first memory that stores addresses of a plurality of NVM devices and a second memory that stores a plurality of indexes.

The NVM device is a NAND flash memory.

According to an exemplary embodiment of the inventive concept, there is provided an NVM controller including: a command decoder configured to recognize a command received from a host and output an index based on the command; and a processor configured to receive the index from the command decoder, extract address information that corresponds to the index from a command mapping table and perform a program corresponding to the extracted address information.

The command decoder includes hardware logic.

The NVM controller is a NAND flash memory controller.

The command mapping table is stored in the processor or a program memory.

The program includes firmware.

BRIEF DESCRIPTION OF THE DRAWINGS

The above and other features of the inventive concept will become more apparent by describing in detail exemplary embodiments thereof with reference to the accompanying drawings in which:

FIG. 3 is a block diagram illustrating a command decoder included in the NVM controller of FIG. 2, according to an exemplary embodiment of the inventive concept;

FIG. 4 is a diagram for explaining an operation of a decode logic included in the command decoder of FIG. 3, according to an exemplary embodiment of the inventive concept;

DETAILED DESCRIPTION OF THE EMBODIMENTS

Hereinafter, exemplary embodiments of the inventive concept will be described in detail with reference to the accompanying drawings.

Figure 1:
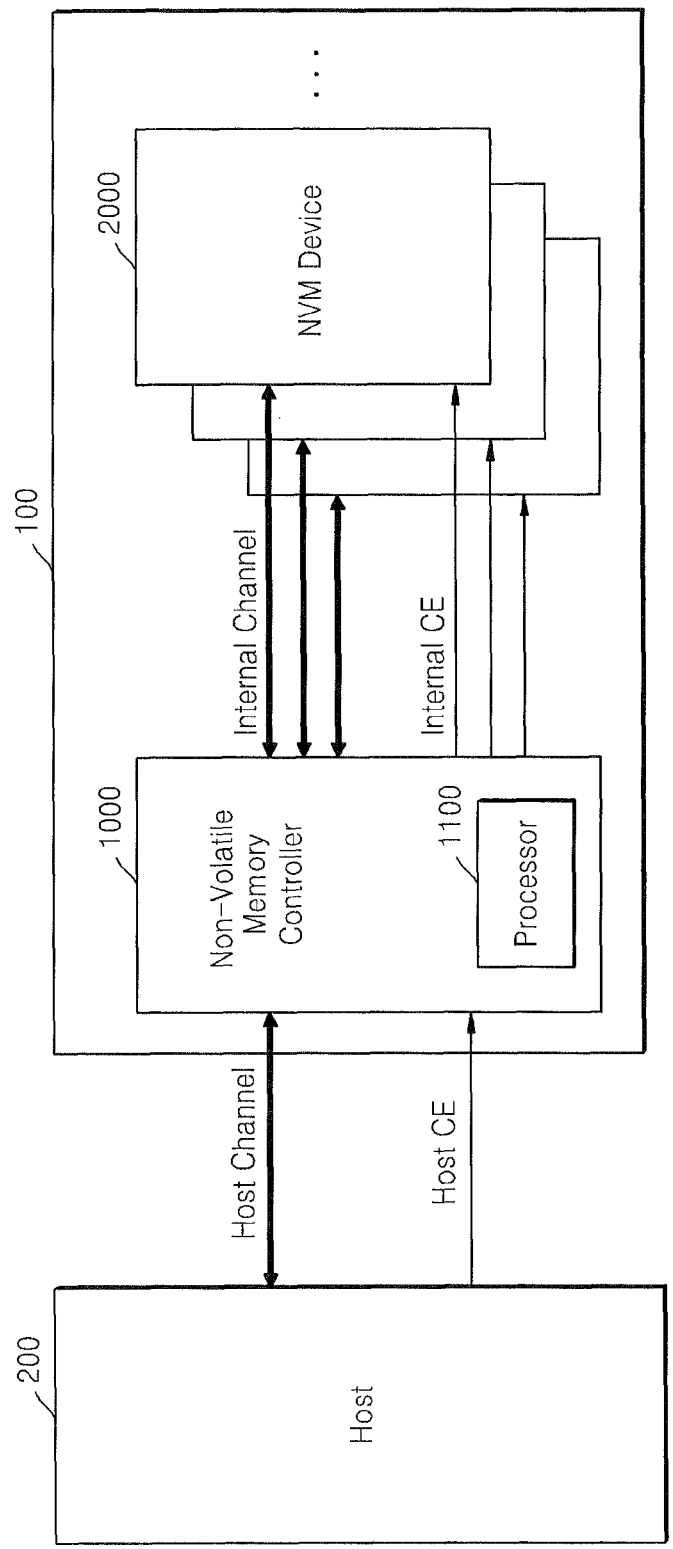
FIG. 1 is a block diagram illustrating a nonvolatile memory (NVM) system according to an exemplary embodiment of the inventive concept.

FIG. 1 is a block diagram illustrating a nonvolatile memory (NVM) system 100 according to an exemplary embodiment of the inventive concept. Referring to FIG. 1, the NVM system 100 includes an NVM controller 1000 and at least one NVM device 2000. The NVM device 2000 may be a semiconductor flash memory device such as a NAND memory chip or a NOR memory chip. In addition, the NVM device 2000 may be a magnetic random-access memory (MRAM), a resistance RAM (RRAM), a ferroelectric RAM (FRAM), or a phase change memory (PCM).

The NVM controller 1000 may communicate with a host 200 via a host channel, and may receive a command and an address and transmit and receive data. The NVM system 100 may receive a host chip enable (CE) signal from the host 200, and may respond to the host 200 via the host channel when the host CE signal is maintained in an active state.

The NVM controller 1000 controls the NVM device 2000 by using an internal channel of the NVM system 100 and an internal CE signal. If the NVM system 100 includes a plurality of the NVM devices 2000, the plurality of NVM devices 2000 may be accessed by using one or more internal CE signals. For example, one NVM device 2000 responds via the internal channel connected thereto when an internal CE signal provided to the NVM device 2000 is maintained in an active state. The NVM controller 1000 may include a processor 1100 which performs a preset program (e.g., firmware) and may perform an operation corresponding to a command received by the NVM controller 1000 from the host 200 on the NVM device 2000.

Figure 2:
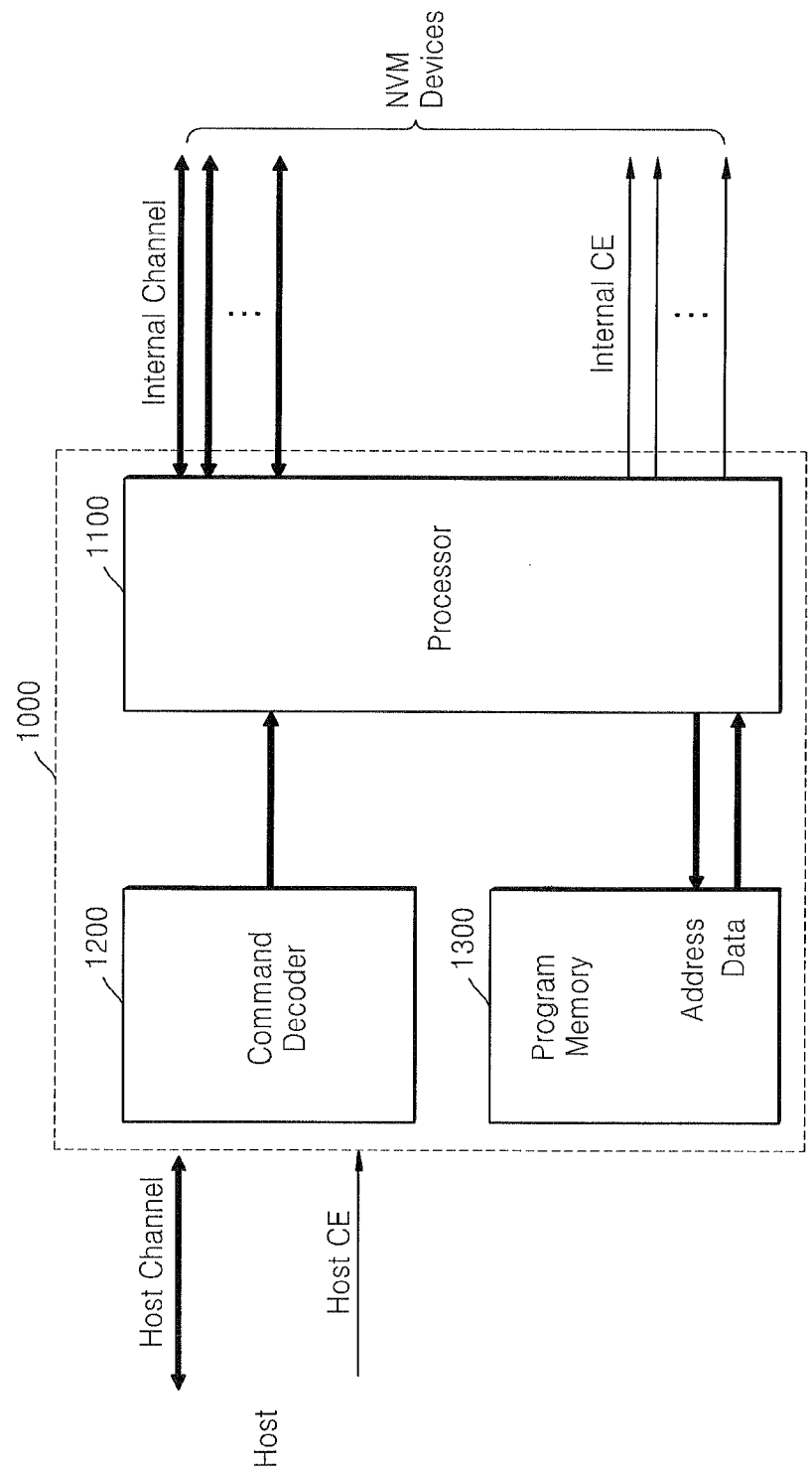
FIG. 2 is a block diagram illustrating an NVM controller included in the NVM system of FIG. 1, according to an exemplary embodiment of the inventive concept.

FIG. 2 is a block diagram illustrating the NVM controller 1000 included in the NVM system 100 of FIG. 1, according to an exemplary embodiment of the inventive concept. The NVM controller 1000 may include the processor 1100, a command decoder 1200, and a program memory 1300.

The command decoder 1200 recognizes a command received via the host channel, and outputs an index and an address of the NVM device 2000 to the processor 1100. The index and the address of the NVM device 2000 will be explained below. The program memory 1300 may be a read-only memory (ROM), and may store a command mapping table and a program to be performed by the processor 1100. The command mapping table will be explained below. The processor 1100 may transmit the address to the program memory 1300, and receive the program and the command mapping table from the program memory 1300. In addition, the processor 1100 may control the NVM device 2000 by using the internal channel and the internal CE signal.

Although not shown in FIG. 2, the NVM controller 1000 may include an error correction code (ECC) for correcting error bits that may be generated during an operation of the NVM system 100, and the ECC may be embodied as firmware performed by the processor 1100 or an ECC engine. In addition, the NVM controller 1000 may further include a RAM (not shown) that acts as a data memory of the processor 1100, and a buffer (not shown) that stores data input/output to/from the NVM device 2000.

FIG. 3 is a block diagram illustrating the command decoder 1200 included in the NVM controller 1000 of FIG. 2, according to an exemplary embodiment of the inventive concept. The command decoder 1200 may include a decode logic 1210 and a first memory and a second memory that may store an output signal of the command decoder 1200. For example, in FIG. 3, the first memory is an address buffer 1220 and the second memory is an index buffer 1230. The decode logic 1210 may recognize a command received via the host channel and output an index corresponding to the command. The index may be transmitted to the processor 1100 via the index buffer 1230, and the processor 1100 may extract address information stored in the command mapping table by using the index.

Commands sequentially received via the host channel may be a command set CMD_SET including a first command a second command. For example, the first command may be a command for preparing for an operation, and the second command may be a command for performing the operation. The decode logic 1210 may sequentially receive the first command and the second command and output one index. In addition, the command set CMD_SET may include an address ADD of the NVM device 2000, and the decode logic 1210 may extract the address ADD of the NVM device 2000 from the command set CMD_SET. The command set CMD_SET will be explained below in detail with reference to FIG. 9.

The decode logic 1210 may output the index and the address ADD of the NVM device 2000. The first memory included in the command decoder 1200, which may be the address buffer 1220, stores a plurality of addresses of a plurality of the NVM memories 2000 and the second memory, which may be the index buffer 1230, stores a plurality of indexes. The address buffer 1220 and the index buffer 1230 are connected to the processor 1100, and the processor 1100 receives the address ADD of the NVM device 2000 and the index.

FIG. 4 is a diagram for explaining an operation of the decode logic 1210 included in the command decoder 1200 of FIG. 3, according to an exemplary embodiment of the inventive concept. The decode logic 1210 may output a unique index according to a command received via the host channel. For example, referring to FIG. 4, when the NVM system 100 receives a command READ_STATUS from the host 200 for outputting a current status of the NVM system 100 to the host 200, the decode logic 1210 may output an index of "01h" which is two hexadecimal digits. When the NVM system 100 receives a command READ_SINGLE from the host 200 for outputting one data from the NVM device 2000 to the host 200, the decode logic 1210 may output an index of "09h."

An error which occurs in a command received via the host channel such that the command may not be recognized may be defined as a command error. The command decoder 1200 may not only perform an operation corresponding to a command but also outputs a preset index when a command error occurs. For example, when a command error occurs, the decode logic 1210 may output an index of "00h." In addition, the decode logic 1210 may output an index corresponding to a command error or an index corresponding to a command received for a predetermined period of time irrespective of a type of a command received via the host channel.

Although an index is an 8-bit index in FIG. 4, the number of bits of an index may vary according to a type of a command received via the host channel. In addition, a value of an index corresponding to a command may be different from that displayed in FIG. 4.

Figure 5:
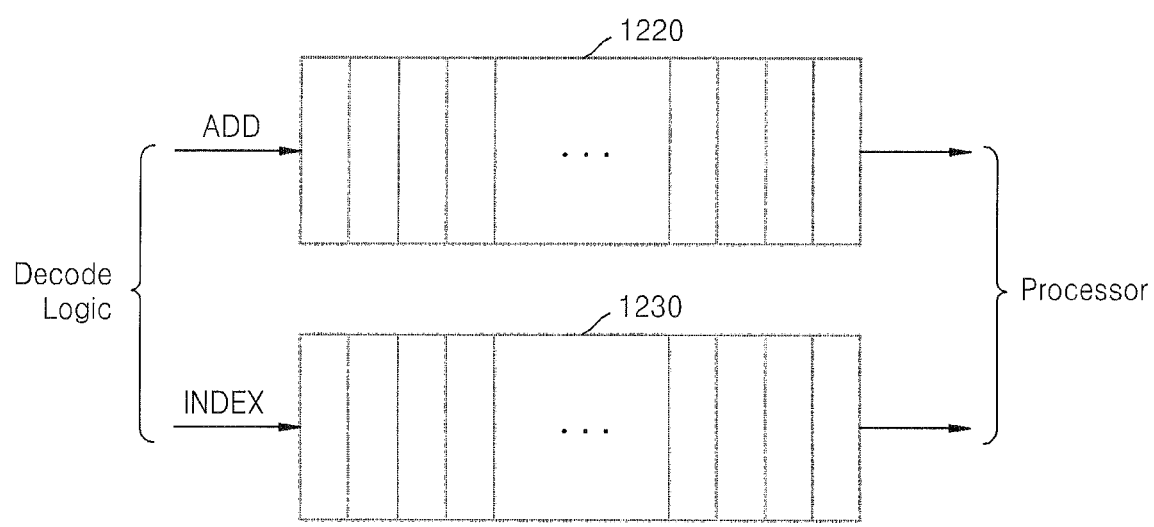
FIG. 5 is a diagram illustrating operations of an index buffer and an address buffer included in the command decoder of FIG. 3, according to an exemplary embodiment of the inventive concept.

FIG. 5 is a diagram for explaining operations of the index buffer 1230 and the address buffer 1220 included in the command decoder 1200 of FIG. 3, according to an exemplary embodiment of the inventive concept. The address buffer 1220 and the index buffer 1230 which are memories for storing an address of the NVM device 2000 and an index may operate as queues. The address of the NVM device 2000 and the index are output signals of the decode logic 1210. The term queue may refer to a first-in-first-out (FIFO) memory structure in which data is sequentially stored and sequentially output in the order they are stored. For example, referring to FIG. 5, the index buffer 1230 receiving indexes INDEX from the decode logic 1210 may sequentially store the indexes INDEX and sequentially output the indexes INDEX in the order the indexes INDEX are stored. Likewise, the address buffer 1220 receiving addresses ADD of the NVM devices 2000 from the decode logic 1210 may sequentially store the addresses ADD and sequentially output the addresses ADD in the order the addresses ADD are stored.

Figure 6:
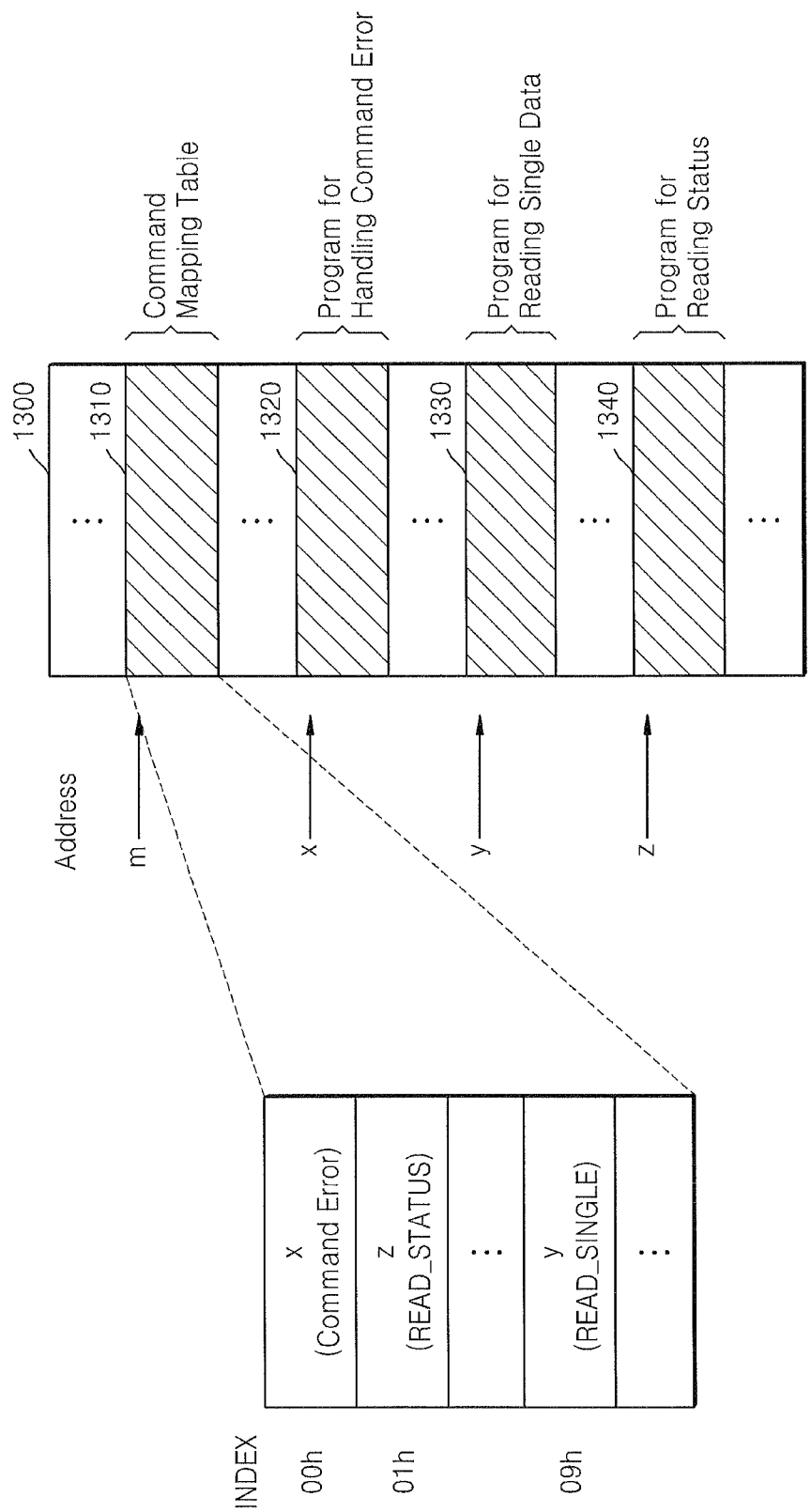
FIG. 6 is a diagram illustrating a program memory included in the NVM controller of FIG. 2, according to an exemplary embodiment of the inventive concept.

FIG. 6 is a diagram illustrating the program memory 1300 included in the NVM controller 1000 of FIG. 2, according to an exemplary embodiment of the inventive concept. The program memory 1300 may store a command mapping table and a program to be performed by the processor 1100. For example, the program memory 1300 of FIG. 6 stores a command mapping table 1310, a program 1320 for processing a command error, a program 1330 for outputting one data from the NVM device 2000, and a program 1340 for outputting a current status of the NVM system 100 in different areas.

The command mapping table 1310 may be defined as data including address information for accessing each program. The processor 1100 may extract the address information included in the command mapping table 1310 by using an index. The index may be a number indicating a position of the address information stored in the command mapping table 1310. For example, the command mapping table 1310 of FIG. 7 includes "x," "z," and "y" as first, second, and tenth address information. Accordingly, indexes of the address information "x," "z," and "y" may be "00h," "01h," and "09h," respectively.

Address information included in the command mapping table 1310 may be an address of the program memory 1300, and each address information may be an address of a different area of the program memory 1300. For example, the command mapping table 1310 of FIG. 6 includes an address of the program memory 1300, and "x," "z," and "y" indicate addresses of different areas of the program memory 1300.

An index of the command mapping table 1310 may be matched to an index output from the command decoder 1200. In other words, when the command decoder 1200 outputs an index in response to a command received via the host channel, the index may be matched to an index of the command mapping table 1310 which includes address information of a program for performing an operation corresponding to the command. For example, a command READ_STATUS for outputting a current status of the NVM system 100 may be received via the host channel by the command decoder 1200. In this case, the decode logic 1210 may output an index of "01h" and the index of "01h" may be transmitted via the index buffer 1230 to the processor 1100. The processor 1100 may receive the index of "01h," extract address information "z" whose index is "01h" from among the address information stored in the command mapping table 1310, and perform the program 1340 stored in an area of the program memory 1300 whose address is "z." Referring to FIG. 6, since the area of the program memory 1300 whose address is "z" is a space in which the program 1340 for outputting a current status of the NVM system 100 is stored, the processor 1100 performs an operation of outputting a current status of the NVM system 100 by using the program 1340.

The command mapping table 1310 may be an array data structure in a source code of the processor 1100, and address information may be an element of the array data structure.

Figure 7:
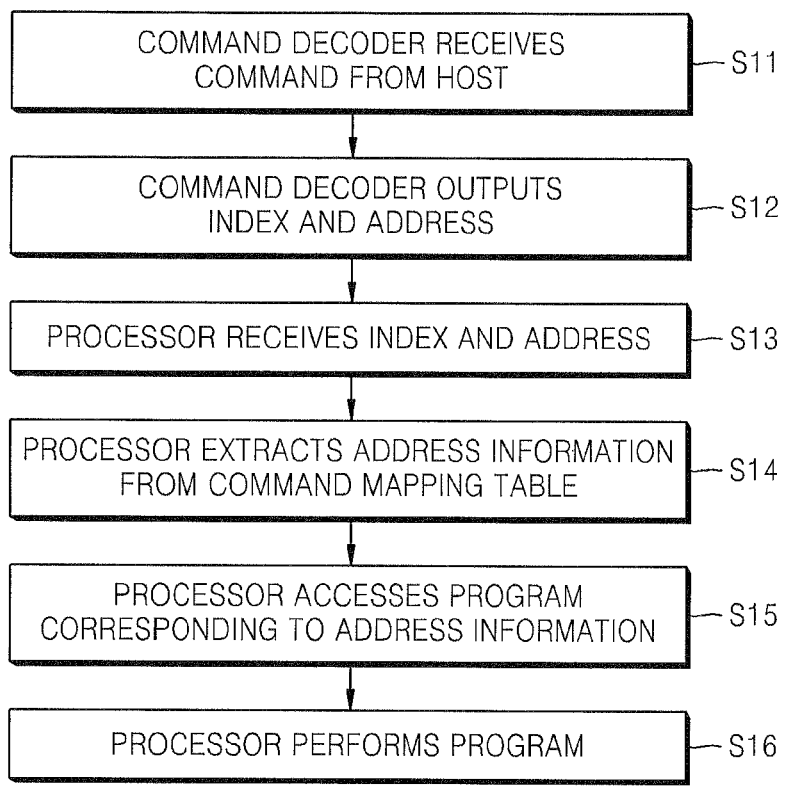
FIG. 7 is a flowchart illustrating a method of operating an NVM controller, according to an exemplary embodiment of the inventive concept.

FIG. 7 is a flowchart illustrating a method of operating an NVM controller, according to an exemplary embodiment of the inventive concept. In operation S11, when a command is transmitted to the NVM controller via a host channel, a command decoder receives the command. In operation S12, the command decoder may output an index corresponding to the command, and extract and output an address according to a type of the command. For example, a command READ_STATUS does not carry an address of an NVM device with it whereas a command READ_SINGLE carries an address of the NVM device with it. In addition, the command decoder may output a preset index when a command error occurs. In operation S13, a processor receives the index and the address from the command decoder. In operation S14, the processor may access a command mapping table, and extract address information from the command mapping table by using the index. In operation S15, the processor may access a program corresponding to the address information. In operation S16, the processor may perform a corresponding operation.

In FIG. 7, the command decoder may include hardware logic. It takes a predetermined period of time to perform operations S11 and S12. In addition, since it also takes a predetermined period of time for the processor to perform operations S13 through S15 irrespective of an index, it may take a predetermined period of time from when the NVM controller receives a command from a host to when it performs a program (e.g., from operation S11 to operation S15).

Figure 8:
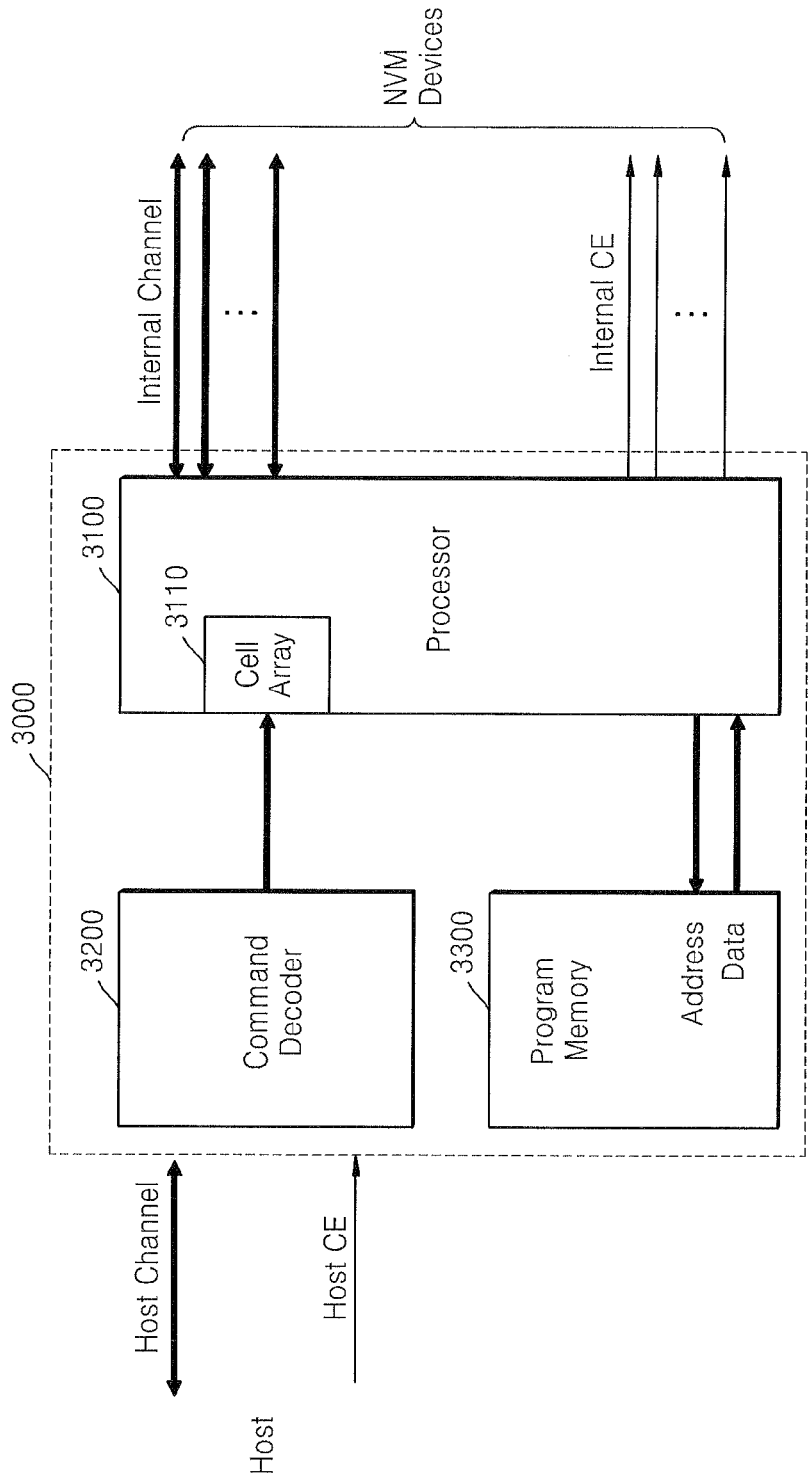
FIG. 8 is a block diagram illustrating an NVM controller according to an exemplary embodiment of the inventive concept.

FIG. 8 is a block diagram illustrating an NVM controller 3000 according to an exemplary embodiment of the inventive concept. The NVM controller 3000 may include a processor 3100, a command decoder 3200, and a program memory 3300. Referring to FIG. 8, the processor 3100 may include a cell array 3110 for storing a command mapping table.

When power is supplied to the NVM system 100, which in this case includes the NVM controller 3000, the processor 3100 may read a command mapping table stored in the program memory 3300 and store the command mapping table in the cell array 3110. Next, the NVM controller 3000 communicates with the host 200 via the host channel. When the host 200 transmits a command to the NVM controller 3000 via the host channel, the command decoder 3200 included in the NVM controller 3000 may output an index corresponding to the command. The cell array 3110 included in the processor 3100 may receive the index from the command decoder 3200 and output address information corresponding to the index by using the command mapping table stored therein. The processor 3100 may read the address information output from the cell array 3110, and access and perform a program corresponding to the address information in the program memory 3300.

The cell array 3110 may be a memory structure that receives an address and stores data. In FIG. 8, the cell array 3110 may receive the index, and store and output the address information. For example, the cell array 3110 may be an NVM (e.g., an electrically erasable programmable read-only memory (EEPROM) or a flash memory) or a volatile memory (e.g., a dynamic random-access memory (DRAM), a static random-access memory (SRAM), or a register set).

Figure 9:
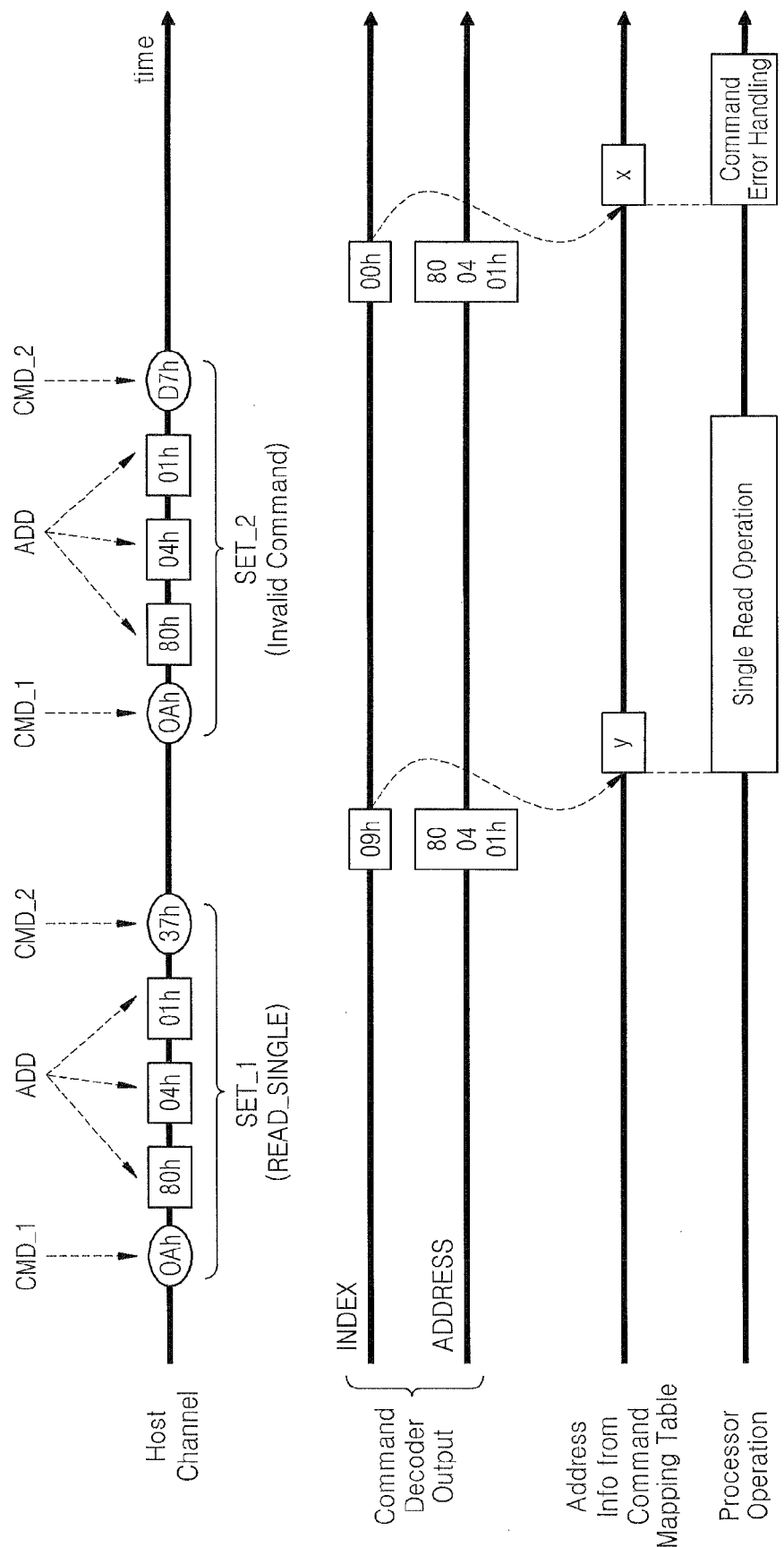
FIG. 9 is a diagram for explaining an operation of the NVM controller of FIG. 2, according to an exemplary embodiment of the inventive concept.

FIG. 9 is a diagram for explaining an operation of the NVM controller 1000, according to an exemplary embodiment of the inventive concept. Commands received via the host channel may be a command set including a first command and a second command, and the command set may include an address of the NVM device 2000. For example, in FIG. 9, the host 200 transmits first and second command sets SET_1 and SET_2 to the NVM controller 1000 via the host channel, and each of the first and second command sets SET_1 and SET_2 sequentially includes a first command CMD_1, a 24-bit address ADD of the NVM device 2000, and a second command CMD_2.

Referring to FIG. 9, for the NVM system 100 to output one data, the first command set SET_1 includes the first and second commands CMD_1 and CMD_2 having values of "0Ah" and "37h," and further includes the address ADD. The first command set SET_1 is a command READ_SINGLE. The host 200 may transmit an address of "800401h" along with the first and second commands CMD_1 and CMD_2, so that the NVM controller 1000 outputs one data stored in an area corresponding to the address of "800401h." The first command set SET_1 is transmitted to the command decoder 1200, and the decode logic 1210 included in the command decoder 1200 receives the first command set SET_1. The decode logic 1210 may extract "800401h" which is the address of the NVM device 2000 from the first command set SET_1 and output the address of "800401h," and may output "09h" which is an index corresponding to the command READ_SINGLE as shown in FIG. 4. "09h" and "800401h" may be respectively temporarily stored in the index buffer 1230 and the address buffer 1220, and are transmitted to the processor 1100.

The processor 1100 may access a command mapping table. If the program memory 1300 and the command mapping table are as shown in FIG. 6, address information "y" whose index is "09h" may be extracted. The processor 1100 may access a program stored in an area of the program memory 1300 whose address is "y," and perform an operation. As shown in FIG. 6, the program stored in the area of the program memory 1300 whose address is "y" is used to perform an operation of reading one data from the NVM device 2000.

As shown in FIG. 9, the second command set SET_2 includes the first command CMD_1, an address of the NVM device 2000, and the second command CMD_2. However, a combination of the first command CMD_1 and the second command CMD_2 is an invalid combination, thereby causing a command error. In this case, the decode logic 1210 included in the command decoder 1200 may output "00h" as shown in FIG. 4. If the program memory 1300 and the command mapping table are as shown in FIG. 6, the processor 1100 may extract address information "x" whose index is "00h." The processor 1100 may access a program stored in an area of the program memory 1300 whose address is "x," and perform an operation. As shown in FIG. 6, the program stored in the area of the program memory 1300 whose address is "x" is used to perform an operation of handling a command error.

Figure 10:
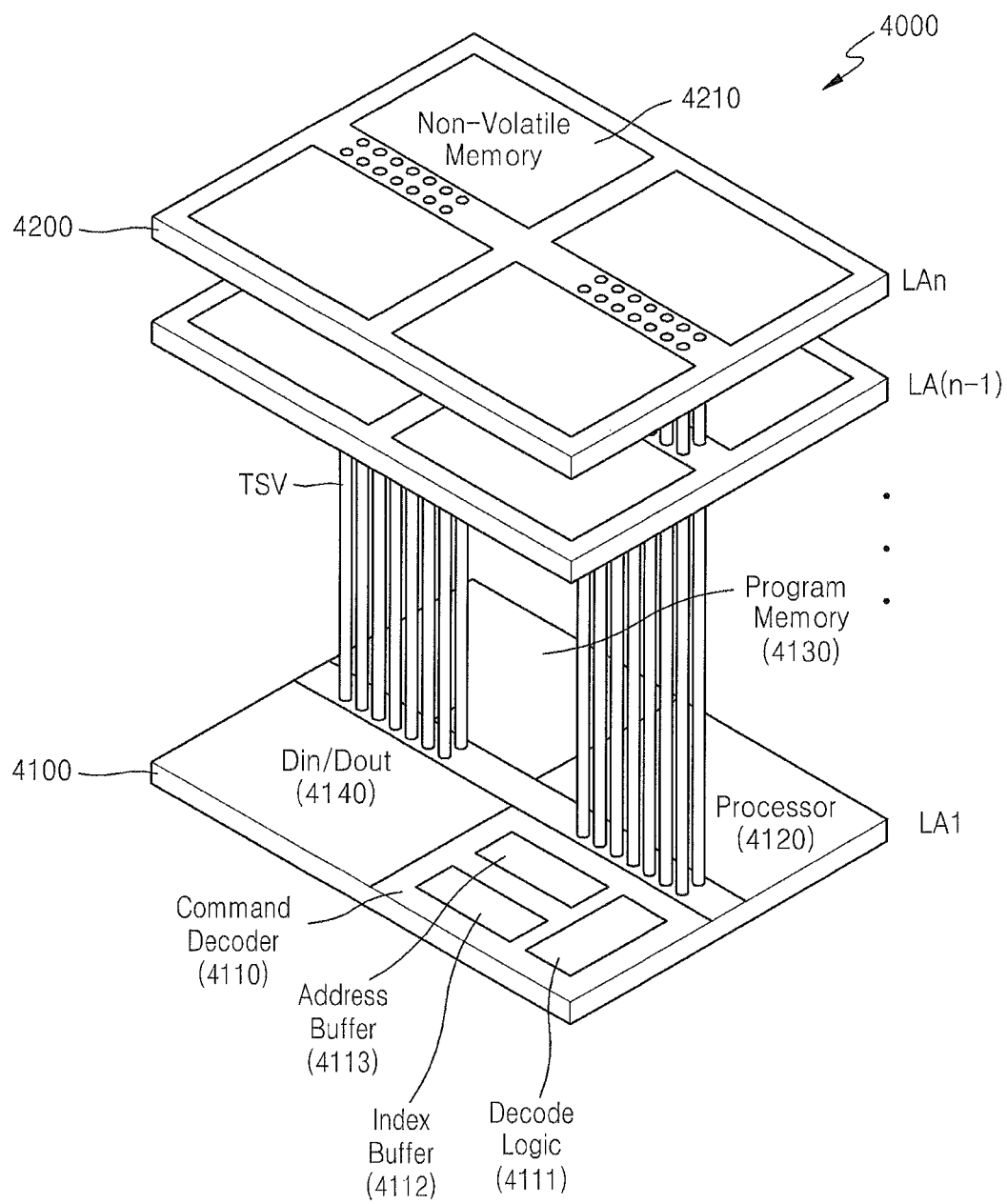
FIG. 10 is a perspective view illustrating the NVM system of FIG. 1, according to an exemplary embodiment of the inventive concept.

FIG. 10 is a perspective view illustrating the NVM system 100, according to an exemplary embodiment of the inventive concept. Referring to FIG. 10, the NVM system 100 may be embodied as a semiconductor device 4000. The semiconductor device 4000 may include a plurality of layers, in other words, first through nth semiconductor layers LA1 through LAn. Each of the first through nth semiconductor layers LA1 through LAn may be an NVM chip (for example, a NAND flash memory chip), or some of the first through nth semiconductor layers LA1 through LAn may be master chips for interfacing with an external host (not shown) and the remaining semiconductor layers may be slave chips for storing data. In FIG. 10, it is assumed that the first semiconductor layer LA1 which is a lowermost semiconductor layer is a master chip and the remaining semiconductor layers are slave chips.

The first through nth semiconductor layers LA1 through LAn may transmit and receive signals via through-silicon vias (TSVs), and the master chip LA1 communicates with the external host through a conductive unit (not shown) formed on an outer surface of the master chip LA1. A structure and an operation of the semiconductor device 4000 will be explained by focusing on the first semiconductor layer LA1 which will be denoted by 4100 hereinafter and the nth semiconductor layer LAn which will be denoted by 4200 hereinafter.

The first semiconductor layer 4100 includes various circuits for driving at least one NVM device 4210 included in each of the slave chips. For example, the first semiconductor layer 4100 may include a command decoder 4110 that receives a command from the external host, a processor 4120 that controls the NVM device 4210, a program memory 4130 that stores a program performed by the processor 4120, and a data input/output unit 4140 that controls data to be input or output. As described above, the command decoder 4110 may include a decode logic 4111 that receives a command and outputs an index and an address, and an index buffer 4112 and an address buffer 4113 which respectively store the index and the address. Although not shown in FIG. 10, the first semiconductor layer 4100 may further include an ECC engine for managing an error occurring during data transmission/reception and a data memory of the processor 4120.

In addition, the nth semiconductor layer 4200 may include at least one NVM device 4210. The NVM device 4210 of the semiconductor layers may be a NAND memory, a NOR memory, an MRAM, an RRAM, an FRAM, or a PCM.

Figure 11:
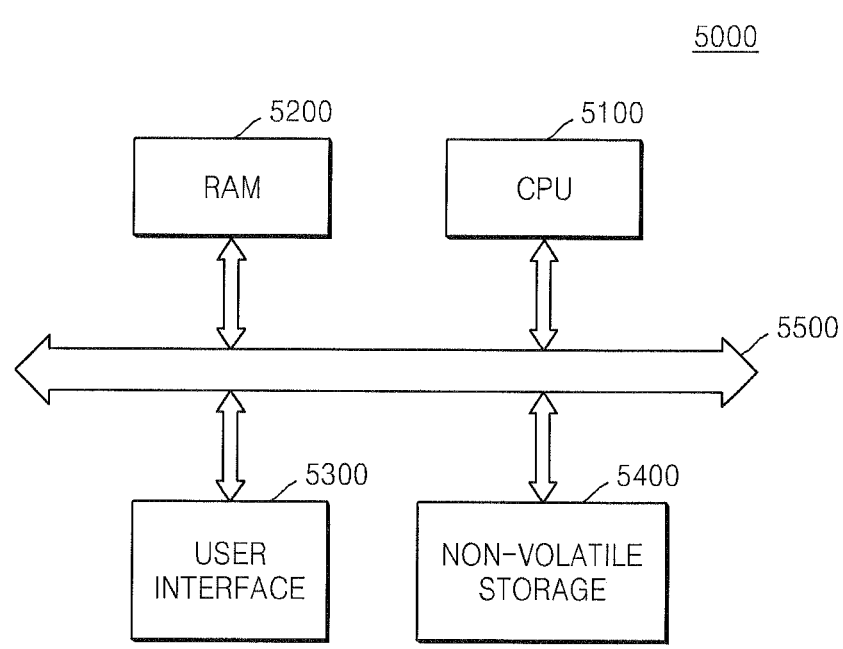
FIG. 11 is a block diagram illustrating a computing system to which an NVM system may be connected, according to an exemplary embodiment of the inventive concept.

FIG. 11 is a block diagram illustrating a computing system 5000 to which an NVM system may be connected, according to an exemplary embodiment of the inventive concept. The NVM system may be connected as a nonvolatile storage device 5400 to the computing system 5000 such as a mobile device or a desktop computer. The NVM system connected as the nonvolatile storage device 5400 may be like the NVM system 100 according to an exemplary embodiment of the inventive concept.

The computing system 5000 may include a central processing unit (CPU) 5100, a RAM 5200, a user interface 5300, and the nonvolatile storage device 5400, which may be electrically connected to a bus 5500. Like an exemplary embodiment of the inventive concept described above, the nonvolatile storage device 5400 may include an NVM device for storing data, a command decoder for receiving a command from the outside, a processor for controlling the NVM device, and a program memory for storing a program performed by the processor. The NVM device included in the nonvolatile storage device 5400 may be a NAND memory, a NOR memory, an MRAM, an RRAM, an FRAM, or a PCM.

Figure 12:
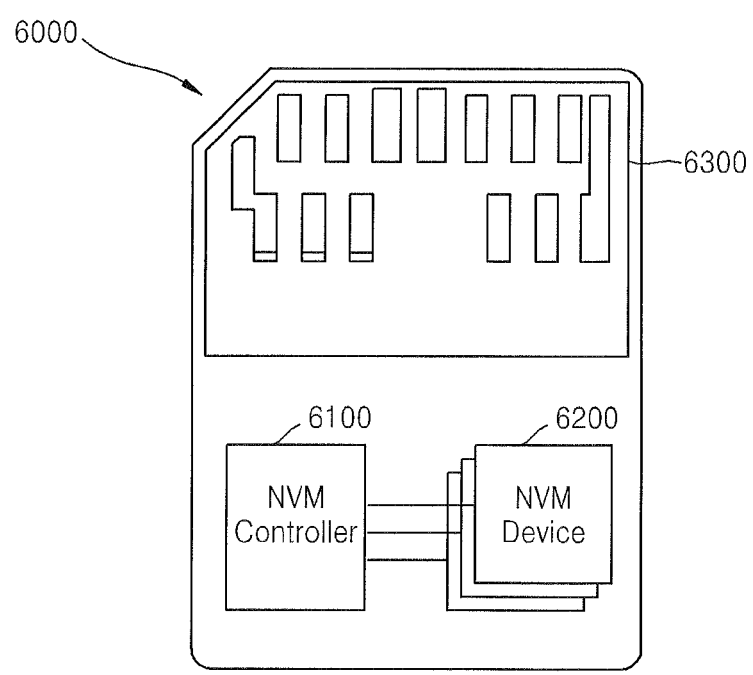
FIG. 12 is a view illustrating a memory card according to an exemplary embodiment of the inventive concept.

FIG. 12 is a view illustrating a memory card 6000 according to an exemplary embodiment of the inventive concept. The memory card 6000 may be a mobile storage device that may be used by being connected to an electronic device such as a mobile device or a desktop computer. As shown in FIG. 12, the memory card 6000 may include an NVM controller 6100, at least one NVM device 6200, and a port area 6300.

The NVM controller 6100 may communicate with an external host (not shown) through the port area 6300, and control the NVM device 6200. Like an exemplary embodiment of the inventive concept described above, the NVM controller 6100 may include a command decoder for receiving a command from the outside, a processor for performing a preset program, and a program memory for storing the preset program. In FIG. 12, the command decoder may receive a command from a host and output an index, and the processor may receive the index, extract address information stored in the program memory, and perform a program corresponding to the address information. The NVM device 6200 may be a NAND memory, a NOR memory, an MRAM, an RRAM, an FRAM, or a PCM.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A nonvolatile memory (NVM) controller, comprising:
a command decoder that receives a command from a host and outputs an index in response to the command;
a program memory that stores a command mapping table comprising address information for accessing a program corresponding to the command; and
a processor that receives the index from the command decoder and controls the address information to be output in response to the index,
wherein the command is a command set that comprises a first command and a second command which are sequentially received at the command decoder,
wherein the command decoder outputs an index in response to the command set,
wherein the command set comprises an address of an NVM device,
wherein the command decoder extracts the address of the NVM device from the command set,
wherein the command decoder comprises a first memory that stores addresses of a plurality of NVM devices,
wherein the processor receives the addresses of the plurality of NVM devices from the first memory.

2. The NVM controller of claim 1, wherein the program memory stores at least one program performed by the processor,
wherein the processor performs a program corresponding to the address information output from the program memory.

3. The NVM controller of claim 1, wherein the program memory stores an error handling program that handles an error in the command,
wherein when the command has the error, the index output from the command decoder is an index of the command mapping table enabling access to the error handling program.

4. The NVM controller of claim 1, wherein the first memory operates as a queue.

5. The NVM controller of claim 1, wherein the processor comprises a cell array that stores data, receives the command mapping table from the program memory, stores the command mapping table in the cell array, and controls the address information stored in the cell array to he output.

6. A nonvolatile memory (NVM) controller, comprising:
a command decoder that receives a command from a host and outputs an index in response to the command;
a program memory that stores a command mapping table comprising address information for accessing a program corresponding to the command; and
a processor that receives the index from the command decoder and controls the address information to be output in response to the index,
wherein the command decoder comprises a first memory that stores a plurality of indexes, wherein the processor receives the plurality of indexes from the first memory,
wherein the first memory operates as a queue.

7. A nonvolatile memory (NVM) system, comprising:
an NNW controller; and
at least one NVM device that is controlled by the NVM controller,
wherein the NVM controller comprises:
a command decoder that receives a command from a host and outputs an index in response to the command;
a program memory that stores a command mapping table comprising address information for accessing a program corresponding to the command; and
a processor that receives the index from the command decoder and controls the address information to be output in response to the index,
wherein the command is a command set that comprises a first command and a second command which are sequentially received at the command decoder,
wherein the command decoder outputs an index in response to the command set,
wherein the command set comprises an address of the NVM device,
wherein the command decoder extracts the address of the NVM device from the command set, and comprises a first memory that stores addresses of a plurality of NVM devices and a second memory that stores a plurality of indexes.

8. The NVM system of claim 7, wherein the program memory stores at least one program performed by the processor,
wherein the processor performs a program corresponding to the address information output from the program memory.

9. The NVM system of claim 7, wherein the NVM device is a NAND flash memory.

10. A nonvolatile memory (NVM) controller, comprising;
a command decoder configured to recognize a command received from a host and output an index based on the command; and
a processor configured to receive the index from the command decoder, extract address information that corresponds to the index from a command mapping table and perform a program corresponding to the extracted address information,
wherein the processor comprises a cell array that stores data, receives the command mapping table from a program memory, stores the command mapping table in the cell array, and controls the address information stored in the cell array to be output.

11. The NVM controller of claim 10, wherein the command decoder includes hardware logic.

12. The NVM controller of claim 10, wherein the NVM controller is a NAND flash memory controller.

13. The NVM controller of claim 10, wherein the program includes firmware.

* * * * *